United States Patent
Yerace et al.

(10) Patent No.: US 10,393,008 B2
(45) Date of Patent: Aug. 27, 2019

(54) METHODS AND SYSTEM FOR ADJUSTING ENGINE AIRFLOW

(71) Applicant: General Electric Company, Schenectady, NY (US)

(72) Inventors: Daniel Yerace, Erie, PA (US); James Robert Mischler, Girard, PA (US); Nathan Synnott Music, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 247 days.

(21) Appl. No.: 15/377,049

(22) Filed: Dec. 13, 2016

(65) Prior Publication Data

US 2018/0163614 A1    Jun. 14, 2018

(51) Int. Cl.
| | |
|---|---|
| *F02B 37/16* | (2006.01) |
| *F02D 41/00* | (2006.01) |
| *F02D 41/14* | (2006.01) |
| *F02D 19/10* | (2006.01) |

(52) U.S. Cl.
CPC .......... *F02B 37/16* (2013.01); *F02D 41/0007* (2013.01); *F02D 41/0025* (2013.01); *F02D 41/1446* (2013.01); *F02D 19/105* (2013.01); *Y02T 10/144* (2013.01); *Y02T 10/36* (2013.01)

(58) Field of Classification Search
CPC .............................. F02B 37/16; F02D 41/0007
USPC ........................................................... 60/611
See application file for complete search history.

(56) References Cited

U.S. PATENT DOCUMENTS

| | | | | |
|---|---|---|---|---|
| 3,232,044 | A | * | 2/1966 | Gratzmuller ........ F02B 29/0412 60/280 |
| 5,259,358 | A | | 11/1993 | Chen |
| 5,278,762 | A | | 1/1994 | Kawamura |
| 5,322,047 | A | | 6/1994 | Oliu |
| 2010/0050630 | A1 | * | 3/2010 | Luken ................... F01N 3/2046 60/602 |
| 2011/0257871 | A1 | | 10/2011 | Takigawa |
| 2012/0210711 | A1 | * | 8/2012 | Petrovic ............... F02B 37/013 60/602 |
| 2012/0222417 | A1 | * | 9/2012 | Fontvieille ............. F02D 23/00 60/602 |

FOREIGN PATENT DOCUMENTS

WO    WO 2016100668 A1 *  6/2016  ......... F02D 41/0082

* cited by examiner

*Primary Examiner* — Ngoc T Nguyen
(74) *Attorney, Agent, or Firm* — McCoy Russell LLP

(57) ABSTRACT

Various methods and systems are provided for adjusting an amount of intake airflow diverted away from an intake manifold and to atmosphere in response to a temperature of exhaust entering a turbocharger turbine and a target pre-turbine temperature. In one example, an amount of intake airflow entering engine cylinders, and thus an air-fuel ratio entering the engine cylinders, may be controlled to maintain the temperature of exhaust entering the turbocharger turbine at the target pre-turbine temperature.

20 Claims, 4 Drawing Sheets

METHODS AND SYSTEM FOR ADJUSTING ENGINE AIRFLOW

FIELD

Embodiments of the subject matter disclosed herein relate to a boosted engine system that includes a turbocharger or supercharger. Other embodiments relate to engine control of such a system.

BACKGROUND

Turbocharging (or supercharging) an engine allows the engine to be boosted and provide power similar to that of a larger displacement engine. Thus, boosting (via the turbocharger or supercharger, for example) can extend the operating region of an engine. Turbochargers and superchargers function by compressing intake air in a compressor, positioned in an intake passage. Turbochargers drive the compressor via a turbine, positioned in an exhaust passage, operated by exhaust gas flow. During engine operation, as a temperature of exhaust gases increase, a temperature of the turbine may increase. If the temperature of exhaust gases entering the turbine increases above a threshold level, turbine degradation and/or reduced performance or reliability of the turbocharger may occur.

BRIEF DESCRIPTION

In one embodiment, a method for an engine (e.g., a method for controlling an engine system) includes adjusting an amount of intake airflow diverted away from an intake manifold and to atmosphere in response to a temperature of exhaust entering a turbocharger turbine and a target pre-turbine temperature.

DETAILED DESCRIPTION

The following description relates to embodiments of adjusting an amount of intake airflow, which include boosted intake airflow, diverted away from an intake manifold and to atmosphere in response to a temperature of exhaust entering a turbocharger (or supercharger) turbine and a target pre-turbine temperature. By adjusting the amount of intake airflow diverted away from the intake manifold, the air-fuel ratio entering engine cylinders may be adjusted. In one example, the amount of intake airflow diverted away from the intake manifold may be controlled via a compressor bypass valve disposed in a bypass passage. The bypass passage may be coupled between atmosphere and an intake passage, upstream of a compressor. In an alternate embodiment, the bypass passage may be coupled to atmosphere and an intake passage, downstream of the compressor and the amount of boosted airflow diverted away from the intake manifold may be controlled via an engine bypass valve disposed in the bypass passage. In yet another embodiment, the bypass passage may be coupled between an exhaust passage, downstream of the turbine and the intake passage, upstream or downstream of the compressor. Opening the compressor bypass valve may increase the amount of intake airflow diverted away from the intake manifold (and diverted away from the compressor when the bypass passage is coupled to the intake passage upstream of the compressor). In another embodiment, additionally or alternatively, a turbocharger wastegate may be opened to reduce the speed of the turbine and thus reduce the flow of air through the compressor and engine. As a result of the above operation, the air-fuel ratio entering engine cylinders may decrease. In another example, the temperature of exhaust entering the turbocharger turbine may be estimated and/or measured based on an output of a temperature sensor positioned in an exhaust passage, upstream of the turbocharger turbine. In yet another example, the temperature of exhaust entering the turbocharger turbine may be estimated based on alternate engine operating parameters. The target pre-turbine temperature may be a set value or a target temperature range that is below an upper threshold pre-turbine temperature.

Figure 1:
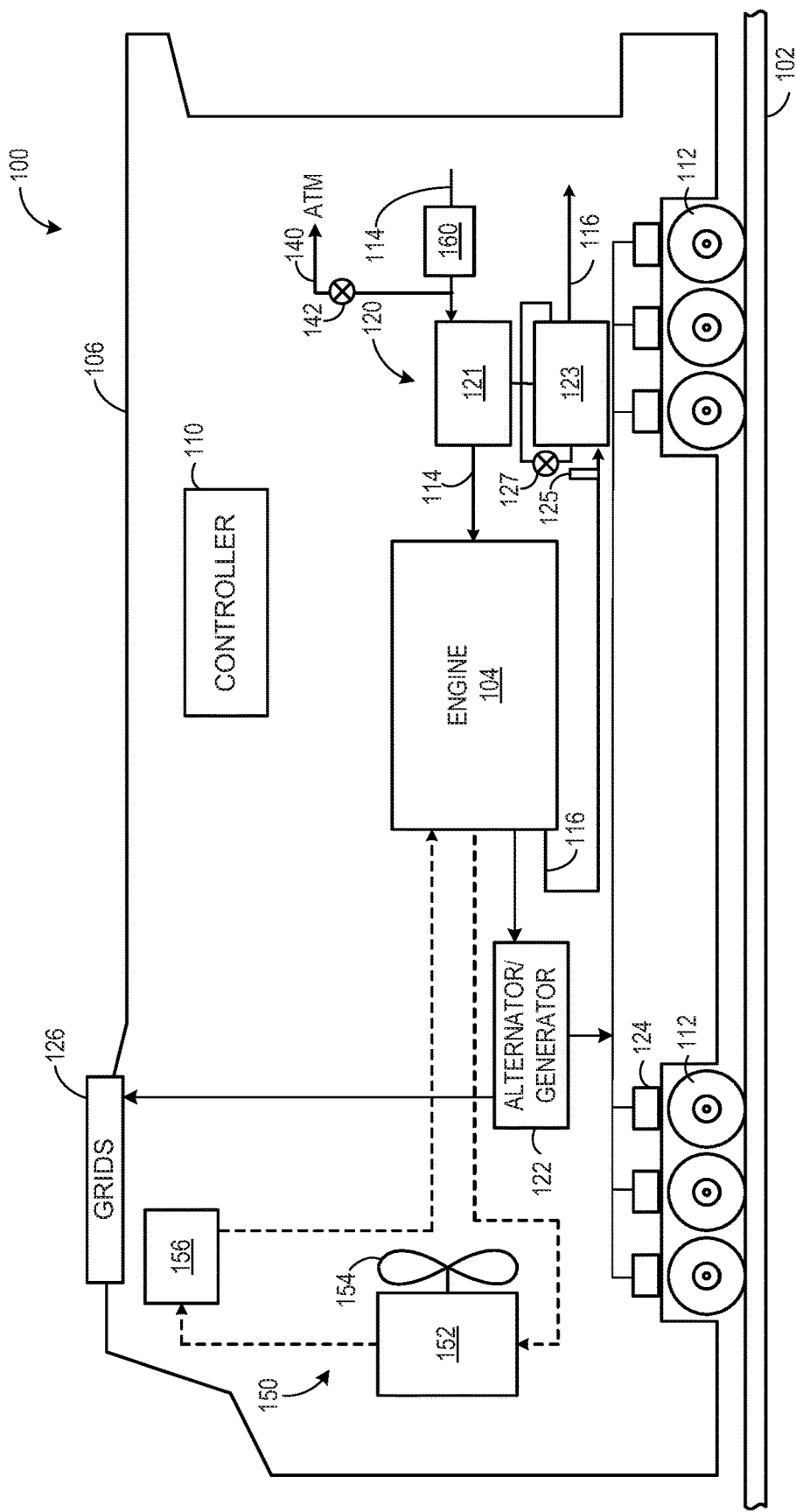
FIG. 1 shows a schematic diagram of a vehicle with an engine, according to an embodiment of the invention.
Figure 3:
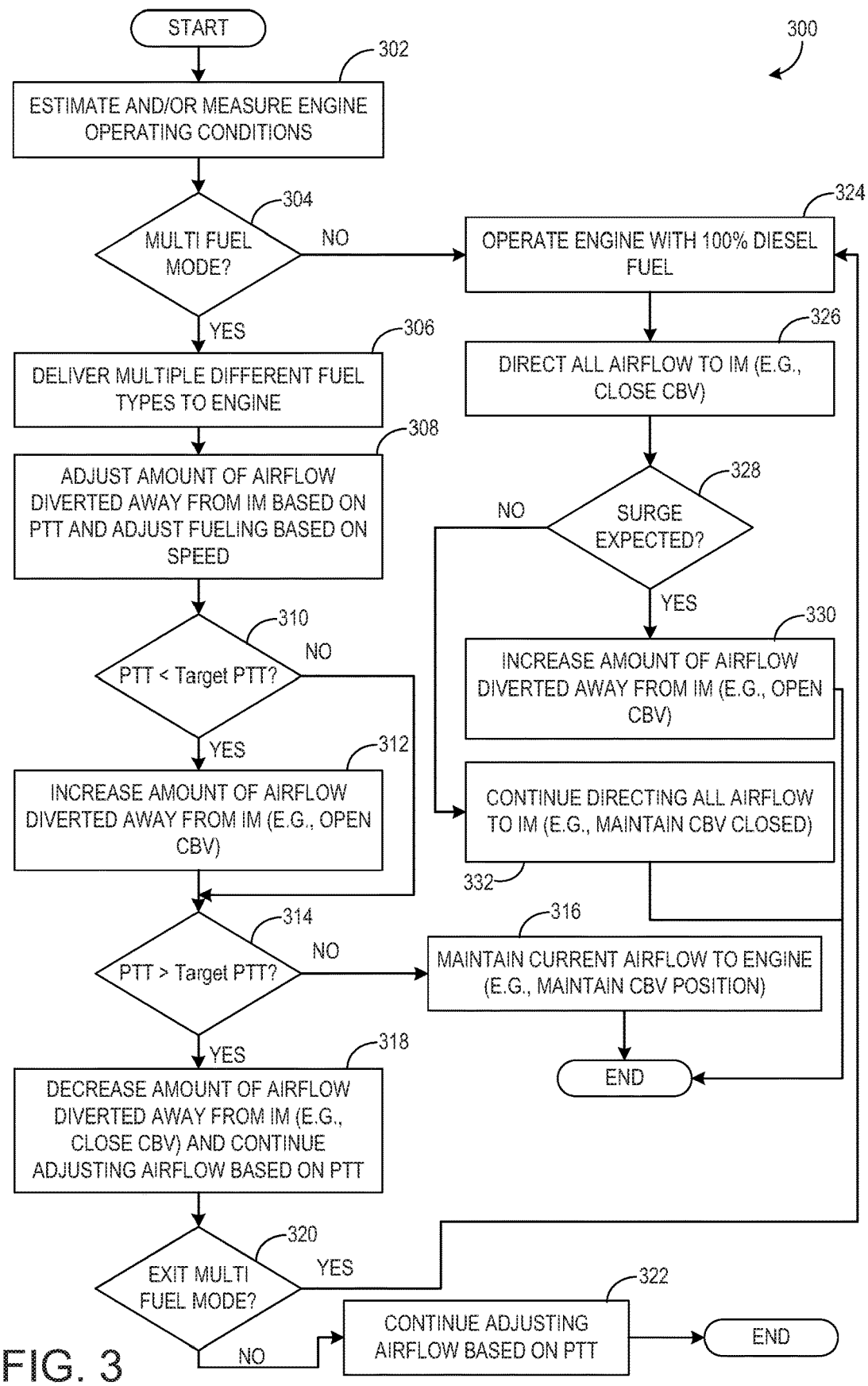
FIG. 3 shows a flow chart of a method for controlling an amount of boosted airflow directed to an intake manifold of an engine based on a temperature of exhaust entering a turbocharger turbine, according to an embodiment of the invention.
Figure 4:
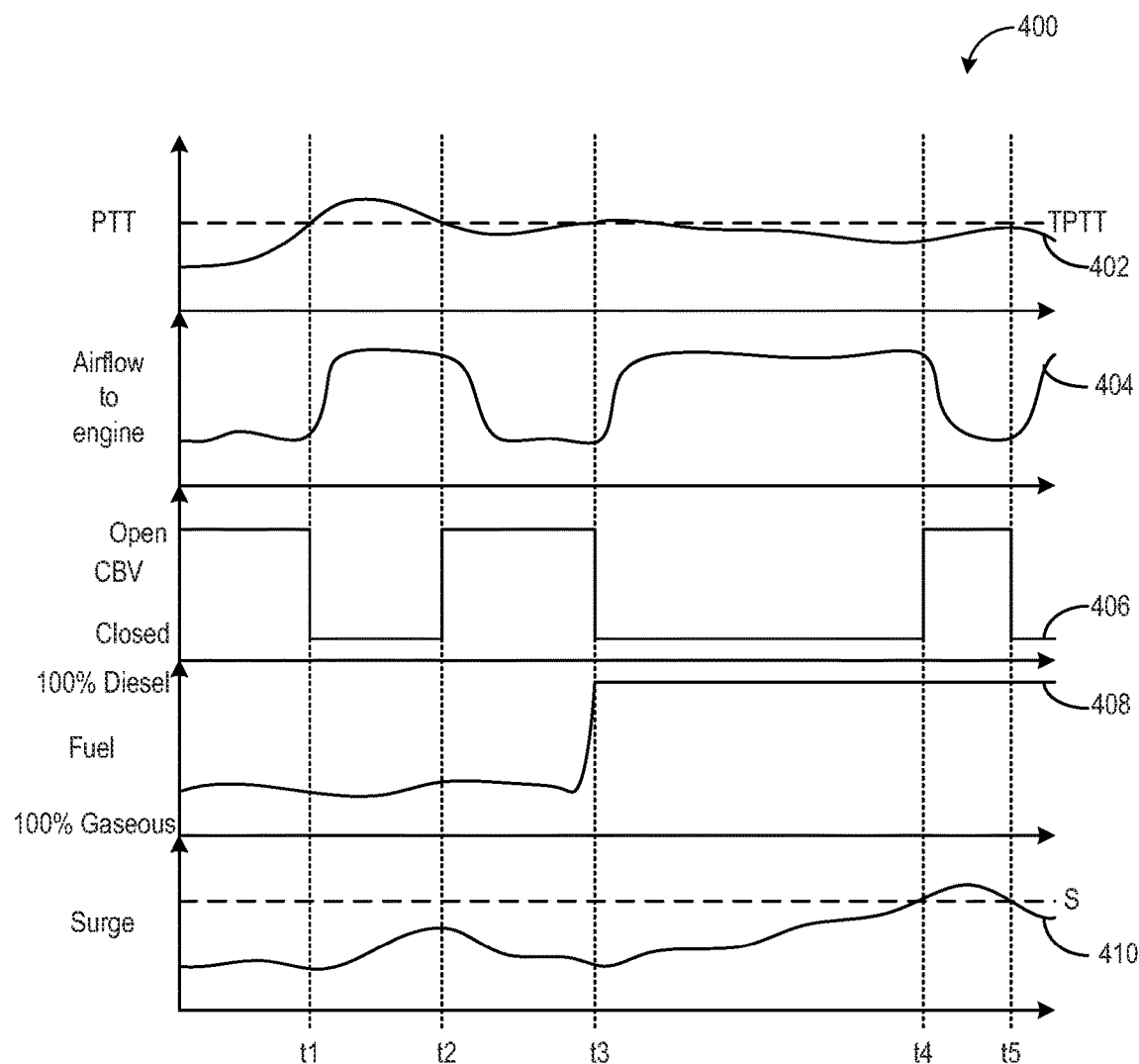
FIG. 4 shows a graph of examples of adjustments to a compressor bypass valve based on a temperature of exhaust entering a turbocharger turbine and fueling mode of the engine, according to an embodiment of the invention.

FIG. 1 shows an example of an engine system including a turbocharger and a compressor bypass passage including an compressor bypass valve (CBV). The compressor bypass passage is coupled to the intake passage, upstream of an intake manifold and upstream of a turbocharger (or supercharger) compressor. The compressor bypass passage may direct boosted intake airflow away from the intake manifold and to atmosphere. As a result, the amount of boosted airflow entering engine cylinders, such as the engine cylinder shown in FIG. 2, may be reduced. In one example, the engine may be a multi-fuel engine, such as the multi-fuel engine shown in FIG. 2, configured to combust two or more fuel types. The engine may switch between operating in a multi-fuel mode where the engine concurrently combust two or more fuel types to a single fuel mode (or diesel fuel mode) where the engine only combusts a single fuel (such as diesel fuel). The amount of boosted airflow diverted away from the intake manifold may be adjusted based on a pre-turbine temperature in a first mode and based on compressor surge in a second mode, as shown in FIG. 3. The first mode may include the multi-fuel mode while the second mode may include the diesel fuel mode. In one example, in the first mode, the CBV may be adjusted to control the pre-turbine temperature to a target pre-turbine temperature. In this way, the temperature of exhaust entering the turbocharger turbine may be controlled to a target level, thereby reducing degradation to the turbocharger and improving turbocharger performance. Example adjustments to a CBV based on fueling mode, pre-turbine temperature, and surge are shown in FIG. 4.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for adjusting the amount of boosted intake airflow diverted away from the intake manifold and to atmosphere in response to the temperature of exhaust entering the turbocharger turbine and the target pre-turbine temperature, an example of a platform is disclosed in which an engine may be configured for a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle includes an engine 104. In other non-limiting embodiments, the engine may be a stationary engine, such as in a power-plant application, or an engine in a marine vessel or other off-highway vehicle propulsion system or systems as noted above.

The engine receives intake air for combustion from an intake passage 114. The intake passage receives ambient air from an air filter 160 that filters air from outside of the rail vehicle. The intake passage may include and/or be coupled to an intake manifold of the engine. Exhaust gas resulting from combustion in the engine is supplied to an exhaust passage 116. Exhaust gas flows through the exhaust passage, and out of an exhaust stack of the rail vehicle. In one example, the engine is a multi-fuel engine that combusts air and two or more fuels through compression ignition. For example, the engine may combust two or more fuels including gasoline, kerosene, natural gas (e.g., gaseous fuel), biodiesel, or other petroleum distillates of similar density through compression ignition (and/or spark ignition, and/or other forms of ignition such as laser, plasma, or the like). As explained further below, the engine may operate in a multi-fuel mode where two or more fuels are simultaneously combusted in engine cylinders or in a single-fuel mode where only a single fuel is combusted in the engine cylinders. In one embodiment, the single-fuel mode may be a diesel fuel mode where 100% diesel fuel is combusted at the engine cylinders. In another example, the engine may be a dual fuel engine that combusts a mixture of gaseous fuel and diesel fuel. As used herein, a substitution ratio may refer to a ratio or percentage of a secondary fuel (such as gaseous fuel) to diesel fuel combusted at the engine cylinders.

In one embodiment, the rail vehicle is a diesel-electric vehicle. As depicted in FIG. 1, the engine is coupled to an electric power generation system, which includes an alternator/generator 122 and electric traction motors 124. In one example, the alternator/generator 122 may include a direct current (DC) generator. For example, the engine is a diesel and/or natural gas engine that generates a torque output that is transmitted to the electric generator which is mechanically coupled to the engine. As explained above, the engine may be a multi-fuel engine operating with diesel fuel and natural gas, but in other examples the engine may use other straight/mono fuels such as gasoline, diesel, or natural gas, or may use various combinations of fuels other than diesel and natural gas.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one of a plurality of wheels 112 to provide tractive power to propel the rail vehicle. One example configuration includes one traction motor per wheel set. As depicted herein, six pairs of traction motors correspond to each of six pairs of motive wheels of the rail vehicle. In another example, alternator/generator 126 may be coupled to one or more resistive grids 126. The resistive grids may be configured to dissipate excess engine torque via heat produced by the grids from electricity generated by the alternator/generator.

The vehicle system includes a turbocharger 120 that is arranged between the intake passage and the exhaust passage. In alternate embodiments, the turbocharger may be replaced with a supercharger. The turbocharger increases air charge of ambient air drawn into the intake passage in order to provide greater charge density during combustion to increase power output and/or engine-operating efficiency. As shown in FIG. 1, the turbocharger includes a compressor 121 (disposed in the intake passage) which is at least partially driven by a turbine 123 (disposed in the exhaust passage). While in this case a single turbocharger is included, the system may include multiple turbine and/or compressor stages. A temperature sensor 125 is positioned in the exhaust passage, upstream of an inlet of the turbine. In this way, the temperature sensor may measure a temperature of exhaust gases entering the turbine. As shown in FIG. 1, a wastegate 127 is disposed in a bypass passage around the turbine and may be adjusted, via actuation from controller 110, to increase or decrease flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio. As described further below, decreasing airflow to the engine (via adjusting the wastegate, in one example) may be responsive to a pre-turbine temperature.

The vehicle system also includes a compressor bypass passage 140 coupled directly to the intake passage, upstream of the compressor and upstream of the engine. In one example, the compressor bypass passage 140 may be coupled to the intake passage, upstream of the intake manifold of the engine. The compressor bypass passage is additionally coupled to atmosphere, or exterior to the engine. In an alternate embodiment, the compressor bypass passage may be coupled to the intake passage, upstream of the compressor, and the exhaust passage, downstream of the turbine. In yet another embodiment, the compressor bypass passage may instead be an engine bypass passage coupled to the intake passage, downstream of the compressor (and have an engine bypass valve disposed therein) and thus divert airflow away from the engine after the airflow has passed through the compressor.

The compressor bypass passage is configured to divert airflow (e.g., from before the compressor inlet) away from the engine (or intake manifold of the engine) and to atmosphere. In the embodiment where the passage is instead an engine bypass passage, the engine bypass passage is configured to divert boosted airflow (e.g., from the compressor outlet) away from the engine and to atmosphere. A compressor bypass valve (CBV) 142 is positioned in the compressor bypass passage and includes an actuator actuatable by a controller 110 to adjust the amount of intake airflow diverted away from the engine and to atmosphere. In one example, the compressor bypass valve may be a two-position, on/off valve. In another example, the compressor bypass valve may be a continuously variable valve adjustable into a fully open position, fully closed position, and a plurality of positions between fully open and fully closed. When the compressor bypass valve is in the fully closed (or closed) position, airflow may be blocked from flowing to atmosphere via the compressor bypass passage. As a result, all the intake airflow may travel to the compressor and then the engine for combustion in the engine cylinders.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system shown in FIG. 1 does not include an exhaust gas recirculation (EGR) system. However, in alternate embodiments, the vehicle system may include an EGR system coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system).

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by the controller. Coolant which is cooled by the radiator enters a tank 156. The coolant may then be pumped by a water, or coolant, pump (not shown) back to the engine or to another component of the vehicle system.

The rail vehicle further includes the engine controller 110 (referred to hereafter as the controller) to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation.

The controller may receive information from a plurality of sensors and may send control signals to a plurality of actuators. The controller, while overseeing control and management of the rail vehicle, may be configured to receive signals from a variety of engine sensors, as further elaborated herein, in order to determine operating parameters and operating conditions, and correspondingly adjust various engine actuators to control operation of the rail vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from temperature sensor 125), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the rail vehicle by sending commands to various components such as the traction motors, the alternator/generator, cylinder valves, fuel injectors, a notch throttle, the compressor bypass valve (or an engine bypass valve in alternate embodiments), a wastegate, or the like. Other actively operating and controlling actuators may be coupled to various locations in the rail vehicle. In one example, adjusting an amount of intake airflow diverted away from the intake manifold and to atmosphere (and thus the amount of boosted intake airflow entering the engine) may include adjusting an actuator of the compressor bypass valve to adjust the amount of airflow bypassing the engine via the compressor bypass passage.

Figure 2:
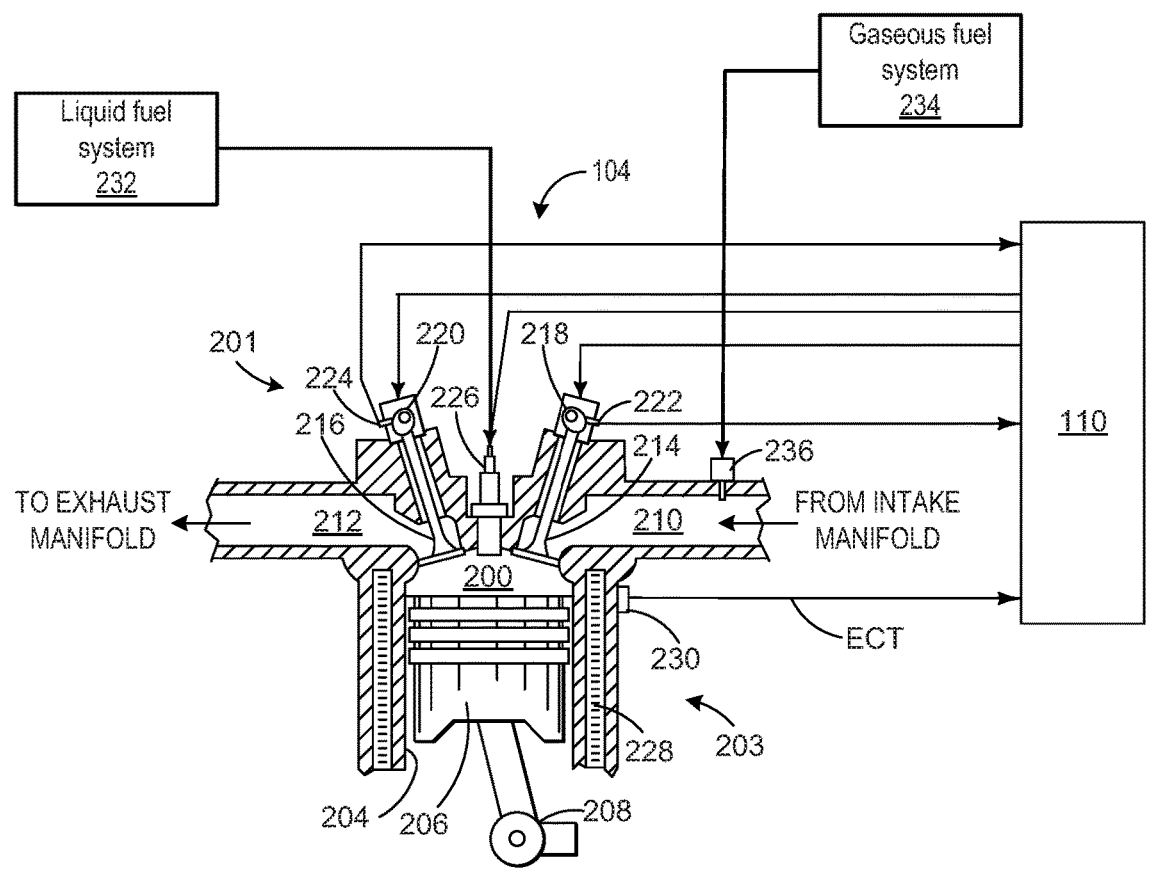
FIG. 2 shows a schematic diagram of a cylinder of a multi-fuel engine, according to an embodiment of the invention.

FIG. 2 depicts an embodiment of a combustion chamber, or cylinder 200, of a multi-cylinder internal combustion engine, such as the engine described above with reference to FIG. 1. The cylinder may be defined by a cylinder head 201, housing the intake and exhaust valves and liquid fuel injector, described below, and a cylinder block 203.

The engine may be controlled at least partially by a control system including controller 110 which may be in further communication with a vehicle system, such as the locomotive described above with reference to FIG. 1. As described above, the controller may further receive signals from various engine sensors including, but not limited to, engine speed, engine load, boost pressure, exhaust pressure, turbocharger speed, ambient pressure, CO2 levels, exhaust temperature, NOx emission, engine coolant temperature (ECT) from temperature sensor 230 coupled to cooling sleeve 228, etc. Correspondingly, the controller may control the vehicle system by sending commands to various components such as alternator, cylinder valves, throttle, fuel injectors, etc.

The cylinder (i.e., combustion chamber) may include cylinder liner 204 with a piston 206 positioned therein. The piston may be coupled to a crankshaft 208 (e.g., via a connecting rod) so that reciprocating motion of the piston is translated into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger (not shown in FIG. 2) and to atmosphere, via an exhaust manifold. The exhaust passage may further receive exhaust gases from other cylinders of the engine in addition to the cylinder, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head. In yet another embodiment, the engine may not include any poppet valves.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example. In yet another example, the intake and exhaust valves shown in FIG. 2 may be mechanically actuated via a rotating camshaft and valvetrain to control opening and closing the valves. In this way, the actuator 218 and actuator 220 may be in the form of a camshaft and valvetrain.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

The amount of air entering the engine cylinders of the engine may change an air-fuel ratio combusted within the engine cylinders. A relationship may exist between the air-fuel ratio for combustion and a temperature of exhaust gases exiting the engine cylinders and traveling to the turbine of the turbocharger. The inventors herein have recognized that as the air-fuel ratio in the engine cylinders decreases (e.g., becomes richer), the pre-turbine temperature (PTT) of the exhaust gases increases. During operation in a diesel mode where 100% diesel fuel (and no other fuel) is combusted within the engine cylinders, the air-fuel ratio may be leaner than stoichiometry. In one example, running the engine as lean as possible in this diesel mode may increase engine performance. Thus, in the diesel mode, all intake airflow may be directed to the intake manifold and engine cylinders, without diverting any of the intake airflow away from the intake manifold and cylinders. In one example, this may include maintaining the compressor bypass valve closed. Under certain conditions, the flow rate and pressure ratio across the turbocharger can fluctuate to levels such that air flow may stop going through the compressor and reverse direction. In some cases, this may cause turbocharger performance issues and compressor or turbine degradation. Such events that create flow instability may be referred to as surge events. As such, a compressor surge level may be defined as a limitation of the mass air flow at the inlet of the compressor. Such turbocharger performance issues may be mitigated by adjusting the flow rate through the compressor and/or the pressure across the compressor, such as by adjusting the compressor bypass valve to divert airflow away from the compressor inlet to avoid or stop a surge event. Thus, if compressor surge is expected or occurs, the controller may increase the opening of the compressor bypass valve to divert airflow away from the compressor and intake manifold and to atmosphere. In a multi-fuel engine, during a multi-fuel mode where at least two different fuel types (e.g., compositions) are combusted simultaneously at the engine cylinders, the air-fuel ratio for combustion may be less lean than in the all diesel mode. However, the air-fuel ratio may still be leaner than stoichiometry in the multi-fuel mode. Thus, in this multi-fuel mode, the air-fuel ratio may be reduced more than in the diesel mode by increasing opening of the compressor bypass valve. Diverting more air away from intake manifold in this way may also increase the surge margin so that the likelihood of surge is lower.

As introduced above, if exhaust temperatures increase above an upper threshold temperature, degradation to the turbine and/or degraded turbocharger performance may occur. Thus, in one example, in the multi-fuel mode, the air-fuel ratio of the mixture for combustion in the engine cylinders may be adjusted based on a target pre-turbine temperature (e.g., target exhaust temperature of exhaust gases entering the turbine inlet). Specifically, the amount of intake airflow entering the engine cylinders (and diverted away from the intake manifold and to atmosphere) may be adjusted based on a current pre-turbine temperature and the target pre-turbine temperature. At the same time, fueling may be adjusted via a speed controller (e.g., based on a desired engine speed). In one example, the target pre-turbine temperature may be less than the upper threshold temperature at which turbocharger degradation occurs. In another example, the controller may adjust the position of the compressor bypass valve to maintain the measured (or estimated) pre-turbine temperature (e.g., exhaust temperature upstream of the turbine) at (or within a threshold of) the target pre-turbine temperature. In this way, degradation to the turbocharger may be reduced.

Further, during engine operation, the air-fuel ratio entering the engine cylinders for combustion may be adjusted for engine efficiency. As discussed above, a relationship between air-fuel ratio and pre-turbine temperature may exist. A map or model of the relationship between air-fuel ratio (for combustion) and pre-turbine temperature may be stored in a memory of an electronic controller of the engine (e.g., as a look-up table indexed by air-fuel ratio and measured pre-turbine temperature). During engine operation, the air-fuel ratio for combustion at the engine cylinders may be controlled via adjusting the compressor bypass valve based on a measured pre-turbine temperature received at the controller. For example, the controller may receive a signal of a measured pre-turbine temperature from a temperature sensor and then look up a corresponding air-fuel ratio within the look-up table. If this air-fuel ratio is different than desired, the controller may adjust the position of the compressor bypass valve to achieve the desired air-fuel ratio for engine efficiency and/or combustion stability.

Turning to FIG. 3, a method for controlling an amount of intake airflow directed to an intake manifold of an engine (and thus an air-fuel ratio for combustion at engine cylinders) based on a temperature of exhaust entering a turbocharger turbine is shown. Instructions for carrying out method 300 may be executed by a controller (such as controller 110 shown in FIGS. 1-2) based on instructions stored on a memory of the controller and in conjunction with signals received from sensors of the engine system, such as the sensors described above with reference to FIGS. 1-2. The controller may employ engine actuators of the engine system to adjust engine operation, according to the methods described below. As one example, the controller may adjust a position of an compressor bypass valve (such as compressor bypass valve 142 shown in FIG. 1) to adjust an amount of intake airflow diverted away from the intake manifold (and engine cylinders) in response to signals received from one or more sensors of the engine system (such as temperature sensor 125 shown in FIG. 1). In an alternate embodiment, the controller may adjust a position of an engine bypass valve (coupled to the intake passage downstream of the compressor instead of upstream) to adjust an amount of boosted intake airflow diverted away from the intake manifold. In yet another embodiment, the amount of intake airflow directed to the intake manifold of the engine may be controlled via adjusting one or more of a turbine wastegate and the compressor bypass valve or engine bypass valve.

Method 300 begins at 302 by estimating and/or measuring engine operating conditions. Engine operating conditions include one or more of engine speed and load, intake manifold pressure (MAP), mass air flow (MAF), a temperature of exhaust gases entering an inlet of a turbocharger turbine (referred to herein as pre-turbine temperature, PTT), a pressure difference across a compressor, a flow rate through the compressor, compressor surge, intake air temperature, or the like. At 304, the method includes determining if the engine is operating in a multi-fuel mode. As discussed above, the multi-fuel mode includes when two or more fuels (e.g., fuel types or fuel compositions) are being concurrently combusted at the engine cylinders. In one embodiment, operating in the multi-fuel mode includes delivering and simultaneously combusting gaseous fuel (e.g., natural gas) and diesel fuel at the engine cylinders. In an alternate embodiment, operating in the multi-fuel mode may include delivering and simultaneously combusting two alternate types of fuels at the engine cylinders.

If the engine is operating in the multi-fuel mode, the method continues to 306 to deliver two or more different fuel types to the engine. In one example, the method at 306 may include delivering both gaseous fuel and diesel fuel to the engine cylinders and simultaneously combusting the mixture of gaseous fuel, diesel fuel, and air within the cylinders. At 308, the method includes adjusting the amount of intake airflow diverted away from the intake manifold based on PTT and adjusting fueling delivered to the engine cylinders based on a speed controller. In one example, adjusting the amount of intake airflow diverted away from the intake manifold may include adjusting the position of the compressor bypass valve (CBV), as described above. In an alternative embodiment, adjusting the amount of intake airflow diverted away from the intake manifold may include adjusting the position of an engine bypass valve disposed in a bypass passage coupled between atmosphere and the intake passage, downstream of the compressor. For example, increasing an amount of opening of the CBV (or fully opening the CBV) may direct more airflow to atmosphere and away from the intake manifold and engine cylinders. Decreasing the amount of opening of the CBV may direct less airflow to atmosphere and away from the intake manifold and engine cylinders (and thus more boosted airflow may enter the engine cylinders). Further, as used herein, the intake airflow may be airflow traveling downstream, toward the engine, from before an inlet of a turbocharger compressor.

In one example, adjusting the amount of intake airflow diverted away from the intake manifold based on PTT may include the controller determining a control signal to send to an actuator of the CBV (or engine bypass valve) based on the determination of PTT. The PTT may be based on a measured PTT (e.g., from a temperature sensor positioned in the exhaust passage, upstream from an inlet to the turbine), or determined based on operating conditions such as a combustion air-fuel ratio, engine speed, an alternate exhaust temperature, or the like. The controller may determine the amount of airflow to divert away from the intake manifold, and a corresponding position, or amount of opening, of the CBV through a determination that directly takes into account a determined PTT, such as increasing the amount of intake airflow diverted away from the intake manifold as PTT decreases below a target (e.g., set or desired) PTT. The controller may alternatively determine the position or amount of opening of the CBV based on a calculation using a look-up table with the input being PTT and the output being the CBV position. In yet another example, the controller may determine the position or amount of opening of the CBV based on a calculation using a look-up table with the input being PTT and the output being an air-fuel ratio which directly corresponds to the CBV position. As another example, the controller may make a logical determination (e.g., regarding a position of the CBV) based on logic rules that are a function of PTT. The controller may then generate a control signal that is sent to the CBV.

In another example, at 308, adjusting fueling delivered to the engine cylinders may be based on a desired engine speed and/or vehicle speed. As such, the controller may adjust, via sending an actuation signal to one or more fuel injectors and/or fuel admission valves, the amount of fuel delivered to the engine cylinders in response to a signal of a desired engine speed and/or vehicle speed.

At 310, the method includes determining whether the PTT (e.g., measured PTT) is less that the target PTT. As explained above, in one example, the target PTT may be below an upper threshold PTT at which turbocharger degradation or reduced performance occurs. In another example, the target PTT may be a temperature above which turbocharger degradation or reduced performance occurs. Thus, the target PTT may be below a maximum PTT for operating the turbocharger. In yet another example, the target PTT temperature may instead be a target PTT temperature range including an upper threshold temperature and a lower threshold temperature. In this way, the CBV may be adjusted to maintain the PTT within the target PTT range. If the PTT is below the target PTT (or below the lower threshold temperature of the target PTT range), the method continues to 312 to increase the amount of intake airflow diverted away from the intake manifold. In one example, this may include increasing the amount of opening of the CBV. In another example, when the CBV is a dual-position valve that can be modulated between fully open and fully closed positions, the method at 312 may include opening (e.g., fully opening so that no flow is blocked through the compressor bypass passage) the CBV.

After adjusting the CBV at 312, or if the PTT is not less than the target PTT, the method continues to 314 to determine whether the PTT is greater than the target PTT (or greater than the upper threshold temperature of the target PTT range). If the PTT is not greater than the target PTT, the PTT may be at the PTT (or within the target PTT range) and, in response, the method continues to 316 to maintain the current amount of airflow to the engine (and the current amount of airflow diverted away from the engine). In one example, the method at 316 may include maintaining the position of the CBV at the currently commanded position.

Alternatively at 314, if the PTT is greater than the target PTT, the method continues to 318 to decrease the amount of intake airflow diverted away from the intake manifold and to continue adjusting the amount of intake airflow diverted away from the intake manifold based on the PTT. In one example, the method at 318 may include decreasing the amount of opening of the CBV or fully closing the CBV to block airflow through the compressor bypass passage. When the CBV is closed all intake airflow may be directed to the engine cylinders. The method at 314 may include continuing to modulate a position of the CBV (e.g., between open and closed) to maintain the PTT at the target PTT (or within the target PTT range). The method then continues to 320 to determine whether there is a request to exit the multi-fuel mode. If there is no request to exit the multi-fuel mode, the method continues to 322 to continue operating in the multi-fuel mode and adjusting the amount of intake airflow diverted away from the intake manifold based on the PTT. Alternatively, if there is a request to exit the multi-fuel mode, the method continues to 324.

In response to a request to exit the multi-fuel mode at 320, or in response to the engine not operating in the multi-fuel mode at 304, the method continues to 324 to operate the engine in a single fuel mode, which may include a diesel fuel mode where 100% diesel fuel is combusted at the engine cylinders (and no additional fuel type). At 326, in response to operating in the diesel fuel mode, the method includes directing all the intake airflow to the intake manifold and not diverting any airflow away from the intake manifold. In one example, this may include closing (e.g., fully closing) the CBV to block any airflow from traveling through the compressor bypass passage and to atmosphere.

At 328, the method includes determining whether compressor surge is expected (or currently occurring). If compressor surge is imminent or currently occurring, the method continues to 330 to increase the amount of intake airflow diverted away from the intake manifold. In one example, this may include increasing the opening of the CBV or fully opening the CBV. After the compressor surge has stopped, the controller may return the CBV to the closed position. Alternatively at 328, if compressor surge is not expected (e.g., based on the flow rate through the compressor, a pressure drop across the compressor, and/or one or more compressor maps stored in the memory of the controller), the method continues to 332 to continue directing all intake airflow to the intake manifold and engine cylinders. As an example, the method at 332 may include maintaining the CBV in the closed position. The method then ends.

FIG. 4 shows example adjustments to a compressor bypass valve based on a temperature of exhaust entering a turbocharger turbine and a fueling mode of the engine. Specifically, graph 400 shows changes in pre-turbine temperature (e.g., a temperature of exhaust gases upstream of an inlet of a turbine), PTT, at plot 402, changes in intake airflow to an engine (e.g., an amount of airflow entering engine cylinders) at plot 404, changes in a position of an compressor bypass valve, CBV, at plot 406, changes in a ratio of gaseous fuel and diesel fuel delivered to engine cylinders at plot 408, and changes to a compressor surge level (e.g., whether or not compressor surge is expected) at plot 410. As described above, the PTT may be estimated based on engine operating parameters or measured via a temperature sensor positioned in an exhaust passage upstream of the turbine (such as temperature sensor 125 shown in FIG. 1). Plot 402 shows the measured PTT relative to a target PTT, TPTT, as described above with reference to FIG. 3. The CBV may be a valve positioned in an compressor bypass passage coupled to an intake passage, upstream of a compressor and upstream of an intake manifold and configured to divert intake airflow away from the intake manifold and to atmosphere (such as CBV 142 shown in FIG. 1). While plot 408 shows changes in a ratio of gaseous fuel and diesel fuel, in alternate embodiments, other fuel types may be used as the fuel sources in the multi-fuel engine. Further, as shown at plot 410, the compressor may be expected to experience surge if the line is over the surge threshold, S, and may not be expected to surge if below the surge threshold S. In the example shown in graph 400, the CBV is a two-position valve adjustable between a fully open and fully closed position (which blocks intake airflow from flowing through the compressor bypass passage). However, in alternate embodiments, the CBV may be a continuously adjustable valve adjustable into a fully open position, fully closed position, and a plurality of positions between fully open and fully closed.

Prior to time t1, the engine is operating in a multi-fuel mode, concurrently combusting a mixture of gaseous fuel and diesel fuel at the engine cylinders (plot 408). Also prior to time t1, the PTT is lower than the TPTT (plot 402). In response to the PTT being less than the TPTT while operating in the multi-fuel mode, the CBV is in the open position (plot 406). Since the CBV is open, more intake airflow may be diverted away from the intake manifold and thus, less boosted intake airflow may be traveling to the engine cylinders (plot 404). At time t1, the PTT increases above the TPTT (plot 402). Responsive to this increase, the controller closes the CBV (plot 406). As a result, the airflow to the engine increases (plot 404). Between time t1 and time t2, the PTT remains below or at the TPTT. As result, the controller maintains the CBV in the open position.

At time t3, the engine transitions from operating in the multi-fuel mode to operating in the diesel mode where only diesel fuel is combusted at the engine cylinders (plot 408). In response to this transition, the controller closes the CBV to direct all the intake airflow to the engine (plots 406 and 404). Between time t3 and t4, the CBV is maintained closed, even when the PTT falls below the TPTT. At time t4, compressor surge is expected (e.g., predicted) (plot 410). In response to an indication of expected compressor surge, the controller opens the CBV. At time t5, compressor surge is no longer happening or expected, and thus, the controller again closes the CBV.

In this way, when the engine is operating in a first, multi-fuel mode, the amount of airflow directed to the engine cylinders may be adjusted based on a measured (or estimated) pre-turbine temperature and a desired (e.g., target) pre-turbine temperature. In one example, the amount of airflow directed to the engine cylinders (and the amount diverted away from the engine cylinders) may be controlled via adjusting a compressor bypass valve disposed in a bypass passage coupled between the intake manifold, upstream of a compressor, and atmosphere. In some embodiments, the compressor bypass valve may instead be an engine bypass valve disposed in an engine bypass passage coupled via the intake passage, downstream of the compressor. In a second, diesel fuel mode, the amount of airflow directed to the engine cylinders may be adjusted based on compressor surge and not based on the pre-turbine temperature. For example, the compressor bypass valve may be maintained closed in this mode unless compressor surge is expected, upon which the valve may be opened. In both modes, the air-fuel ratio delivered to the engine cylinders may be leaner than stoichiometry. However, by controlling the compressor bypass valve as described above, the air-fuel ratio may be leaner in the diesel mode than the multi-fuel mode, thereby increasing engine efficiency and engine performance in the diesel fuel mode. The technical effect of adjusting the amount of intake airflow diverted away from the intake manifold and to atmosphere in response to the temperature of exhaust entering the turbocharger turbine (e.g., pre-turbine temperature) and a target pre-turbine temperature is to reduce turbocharger degradation and increase the efficiency of turbocharger operation, while maintaining an overall leaner than stoichiometric mixture for combustion at the cylinder and reducing the instance of compressor surge. As a result, engine efficiency may be increased. Further, by adjusting the amount of intake airflow diverted away from the intake manifold (and thus the air-fuel ratio entering the engine cylinders) based on pre-turbine temperature instead of a reading from an exhaust oxygen sensor, an extra engine sensor may be eliminated and/or engine control complexity may be reduced.

As one embodiment, a method for an engine comprises adjusting an amount of intake airflow diverted away from an intake manifold and to atmosphere in response to a temperature of exhaust entering a turbocharger turbine and a target pre-turbine temperature. In one example, the engine is a multi-fuel engine and the method further comprises concurrently delivering two different fuel types to the engine while adjusting the amount of intake airflow diverted away from the intake manifold and to atmosphere in response to the temperature of exhaust entering the turbocharger turbine and the target pre-turbine temperature. Additionally, the two different fuel types may include diesel fuel and gaseous fuel and the method may further comprise, in response to switching from concurrently delivering the two different fuel types to delivering only diesel fuel to the engine: stopping adjusting the amount of intake airflow diverted away from the intake manifold and to atmosphere in response to the temperature of exhaust entering the turbocharger turbine and the target pre-turbine temperature; and only diverting intake airflow away from the intake manifold and to atmosphere in response to surging of a turbocharger compressor. In one example, adjusting the amount of intake airflow diverted away from the intake manifold and to atmosphere includes increasing the amount of intake airflow diverted away from the intake manifold and to atmosphere in response to the temperature of exhaust entering the turbocharger turbine being below the target pre-turbine temperature. The adjusting the amount of intake airflow diverted away from the intake manifold and to atmosphere may additionally include decreasing the amount of intake airflow diverted away from the intake manifold and to atmosphere in response to the temperature of exhaust entering the turbocharger turbine being above the target pre-turbine temperature. In another example, adjusting the amount of intake airflow includes adjusting a position of a compressor bypass valve disposed in an compressor bypass passage coupled between an intake passage, upstream of a turbocharger compressor and upstream of the intake manifold, and atmosphere. For example, the method may include opening the compressor bypass valve in response to the temperature of exhaust entering the turbocharger turbine being below the target pre-turbine temperature and maintaining the compressor bypass valve in an open position until the temperature of exhaust entering the turbocharger turbine exceeds the target pre-turbine temperature, and then closing the compressor bypass valve. The method may further comprise modulating the position of the compressor bypass valve between open and closed to maintain the temperature of exhaust entering the turbocharger turbine at the target pre-turbine temperature. In yet another example, the method may additionally include adjusting fueling to engine cylinders of the engine based on a desired engine speed. Further, the temperature of exhaust entering the turbocharger turbine may be measured via a temperature sensor disposed in an exhaust passage upstream of an inlet to the turbocharger turbine.

As another embodiment, a method for an engine comprises: during a first mode, adjusting a position of a compressor bypass valve in response to an exhaust temperature upstream of a turbine, the compressor bypass valve disposed in a bypass passage coupled between atmosphere and an intake passage, upstream of an intake manifold and a compressor; and during a second mode, adjusting the position of the compressor bypass valve in response to compressor surge and not the exhaust temperature upstream of the turbine. The method may further comprise during the first mode, opening the compressor bypass valve until the exhaust temperature upstream of the turbine increases above a target pre-turbine temperature; and during the second mode, maintaining the compressor bypass valve closed unless compressor surge occurs or is expected. In one example, the first mode includes when a mixture of diesel fuel and gaseous fuel are being combusted in engine cylinders of the engine and wherein the second mode includes when only diesel fuel is being combusted in the engine cylinders. The method may further comprise, during the first mode, opening the compressor bypass valve in response to the exhaust temperature upstream of the turbine being below a target pre-turbine temperature and closing the compressor bypass valve in response to the exhaust temperature upstream of the turbine being above the target pre-turbine temperature. In another example, the method may comprise, during the first mode, modulating the position of the compressor bypass valve between open and closed to maintain the exhaust temperature upstream of the turbine at the target pre-turbine temperature. The method may additionally include transitioning from the first mode to the second mode in response to transitioning from injecting a mixture of diesel fuel and gaseous fuel in engine cylinders to injecting only diesel fuel into the engine cylinders and wherein transitioning from the first mode to the second mode includes closing the compressor bypass valve. In one example, the target pre-turbine temperature is a temperature below an upper pre-turbine temperature limit at which degradation of the turbine occurs.

As yet another embodiment, a system for an engine comprises: a turbocharger including a turbine arranged in an exhaust passage and a compressor arranged in an intake passage of the engine; a compressor bypass passage including a compressor bypass valve and coupled between the intake passage, upstream of an intake manifold and the compressor, and atmosphere; a controller with computer readable instructions stored in memory for: combusting a mixture of diesel fuel and gaseous fuel at engine cylinders of the engine; and adjusting a position of the compressor bypass valve in response to a temperature upstream of the turbine and a target pre-turbine temperature. The system may further include a temperature sensor disposed in the exhaust passage upstream of the turbine, where the temperature upstream of the turbine is a measured temperature output by the temperature sensor. The instructions may further include instructions for transitioning from combusting the mixture to combusting only diesel fuel at the engine cylinders and, in response to the transition, adjusting the position of the compressor bypass valve in response to surging of the compressor and not based on the temperature upstream of the turbine.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:
1. A method for an engine, comprising:
during a first mode, adjusting a position of a compressor bypass valve in response to an exhaust temperature upstream of a turbine, the compressor bypass valve disposed in a bypass passage coupled between atmosphere and an intake passage, upstream of an intake manifold and a compressor; and
during a second mode, adjusting the position of the compressor bypass valve in response to compressor surge and not the exhaust temperature upstream of the turbine.
2. The method of claim 1, further comprising:
during the first mode, opening the compressor bypass valve until the exhaust temperature upstream of the turbine increases above a target pre-turbine temperature; and
during the second mode, maintaining the compressor bypass valve closed unless compressor surge occurs or is expected.
3. The method of claim 2, wherein the target pre-turbine temperature is a temperature below an upper pre-turbine temperature limit at which degradation of the turbine occurs.
4. The method of claim 1, wherein the first mode includes when a mixture of diesel fuel and gaseous fuel are being combusted in engine cylinders of the engine and wherein the second mode includes when only diesel fuel is being combusted in the engine cylinders.

5. The method of claim 1, further comprising, during the first mode, opening the compressor bypass valve in response to the exhaust temperature upstream of the turbine being below a target pre-turbine temperature and closing the compressor bypass valve in response to the exhaust temperature upstream of the turbine being above the target pre-turbine temperature.

6. The method of claim 5, further comprising, during the first mode, modulating the position of the compressor bypass valve between open and closed to maintain the exhaust temperature upstream of the turbine at the target pre-turbine temperature.

7. The method of claim 1, further comprising transitioning from the first mode to the second mode in response to transitioning from injecting a mixture of diesel fuel and gaseous fuel in engine cylinders to injecting only diesel fuel into the engine cylinders and wherein transitioning from the first mode to the second mode includes closing the compressor bypass valve.

8. A method for an engine, comprising:
adjusting an amount of intake airflow diverted away from an intake manifold and to atmosphere in response to a temperature of exhaust entering a turbocharger turbine and a target pre-turbine temperature, wherein the adjusting the amount of intake airflow diverted away from the intake manifold and to atmosphere includes:
increasing the amount of intake airflow diverted away from the intake manifold and to atmosphere in response to the temperature of exhaust entering the turbocharger turbine being below the target pre-turbine temperature; and
decreasing the amount of intake airflow diverted away from the intake manifold and to atmosphere in response to the temperature of exhaust entering the turbocharger turbine being above the target pre-turbine temperature.

9. The method of claim 8, wherein the engine is a multi-fuel engine and further comprising concurrently delivering two different fuel types to the engine while adjusting the amount of intake airflow diverted away from the intake manifold and to atmosphere in response to the temperature of exhaust entering the turbocharger turbine and the target pre-turbine temperature.

10. The method of claim 9, wherein the two different fuel types include diesel fuel and gaseous fuel and further comprising, in response to switching from concurrently delivering the two different fuel types to delivering only diesel fuel to the engine:
stopping adjusting the amount of intake airflow diverted away from the intake manifold and to atmosphere in response to the temperature of exhaust entering the turbocharger turbine and the target pre-turbine temperature; and
only diverting intake airflow away from the intake manifold and to atmosphere in response to surging of a turbocharger compressor.

11. The method of claim 8, wherein adjusting the amount of intake airflow includes adjusting a position of a compressor bypass valve disposed in a compressor bypass passage coupled between an intake passage, upstream of a turbocharger compressor and upstream of the intake manifold, and atmosphere.

12. The method of claim 11, further comprising opening the compressor bypass valve in response to the temperature of exhaust entering the turbocharger turbine being below the target pre-turbine temperature and maintaining the compressor bypass valve in an open position until the temperature of exhaust entering the turbocharger turbine exceeds the target pre-turbine temperature, and then closing the compressor bypass valve.

13. The method of claim 12, further comprising modulating the position of the compressor bypass valve between open and closed to maintain the temperature of exhaust entering the turbocharger turbine at the target pre-turbine temperature.

14. The method of claim 8, further comprising adjusting fueling to engine cylinders of the engine based on a desired engine speed.

15. The method of claim 8, wherein the temperature of exhaust entering the turbocharger turbine is measured via a temperature sensor disposed in an exhaust passage upstream of an inlet to the turbocharger turbine.

16. The method of claim 8, wherein the target pre-turbine temperature is a temperature below an upper pre-turbine temperature limit at which degradation of the turbocharger turbine occurs.

17. A system for an engine, comprising:
a turbocharger including a turbine arranged in an exhaust passage and a compressor arranged in an intake passage of the engine;
a compressor bypass passage including a compressor bypass valve and coupled between the intake passage, upstream of an intake manifold and the compressor, and atmosphere;
a controller with computer readable instructions stored in memory for:
combusting a mixture of diesel fuel and gaseous fuel at engine cylinders of the engine;
adjusting a position of the compressor bypass valve in response to a temperature upstream of the turbine and a target pre-turbine temperature; and
transitioning from combusting the mixture to combusting only diesel fuel at the engine cylinders and, in response to the transition, adjusting the position of the compressor bypass valve in response to surging of the compressor and not based on the temperature upstream of the turbine.

18. The system of claim 17, further comprising a temperature sensor disposed in the exhaust passage upstream of the turbine and wherein the temperature upstream of the turbine is a measured temperature output by the temperature sensor.

19. The system of claim 17, wherein the target pre-turbine temperature is a temperature below an upper pre-turbine temperature limit at which degradation of the turbine occurs.

20. The system of claim 17, wherein adjusting the compressor bypass valve in response to surging of the compressor and not based on the temperature upstream of the turbine includes maintaining the compressor bypass valve closed unless compressor surge occurs or is expected.

* * * * *